United States Patent
Liu et al.

(10) Patent No.: US 9,572,181 B2
(45) Date of Patent: Feb. 14, 2017

(54) METHOD FOR TRANSMITTING ENHANCED RANDOM ACCESS SEQUENCE AND MACHINE TYPE COMMUNICATION TERMINAL

(71) Applicant: ZTE Corporation, Shenzhen (CN)

(72) Inventors: Kun Liu, Shenzhen (CN); Bo Dai, Shenzhen (CN); Shuqiang Xia, Shenzhen (CN); Jing Shi, Shenzhen (CN); Xincai Li, Shenzhen (CN); Huiying Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/439,692

(22) PCT Filed: Oct. 23, 2013

(86) PCT No.: PCT/CN2013/085819
§ 371 (c)(1),
(2) Date: Apr. 30, 2015

(87) PCT Pub. No.: WO2014/067414
PCT Pub. Date: May 8, 2014

(65) Prior Publication Data
US 2015/0289291 A1    Oct. 8, 2015

(30) Foreign Application Priority Data
Nov. 2, 2012   (CN) .......................... 2012 1 0433419

(51) Int. Cl.
*H04W 74/08*   (2009.01)
*H04W 4/00*    (2009.01)

(52) U.S. Cl.
CPC ......... *H04W 74/0833* (2013.01); *H04W 4/005* (2013.01); *H04W 74/08* (2013.01)

(58) Field of Classification Search
CPC ... H04W 74/0833; H04W 74/08; H04W 4/005
See application file for complete search history.

(56) References Cited

U.S. PATENT DOCUMENTS

| 2006/0126570 A1 | 6/2006 | Kim et al. |
| 2009/0046629 A1 | 2/2009 | Jiang et al. |

(Continued)

FOREIGN PATENT DOCUMENTS

| CN | 101500241 A | 8/2009 |
| WO | 2008115247 A1 | 9/2008 |

(Continued)

OTHER PUBLICATIONS

Supplemental European Search Report of EP Application No. 13851948, dated Sep. 1, 2015.

(Continued)

*Primary Examiner* — Albert T Chou
(74) *Attorney, Agent, or Firm* — Banner & Witcoff, Ltd.

(57) ABSTRACT

A method for transmitting an enhanced random access sequence and a machine type communication terminal, wherein node 1 generates an enhanced random access sequence according to a random access sequence and enhanced configuration information, and the node 1 sends the enhanced random access sequence on an enhanced random access channel. The embodiment of the present document performs an enhanced design on a random access channel in the LTE/LTE-A system to improve the access quality of a machine type communication terminal and ensure that a machine type communication terminal can normally access the system.

17 Claims, 7 Drawing Sheets

(56) References Cited

U.S. PATENT DOCUMENTS

| | | | | |
|---|---|---|---|---|
| 2010/0103889 A1* | 4/2010 | Kim | ................... | H04W 74/004 |
| | | | | 370/329 |
| 2011/0292816 A1* | 12/2011 | Lee | ..................... | H04W 16/24 |
| | | | | 370/252 |
| 2012/0099543 A1* | 4/2012 | Yang | ................... | H04W 74/006 |
| | | | | 370/329 |
| 2013/0072244 A1* | 3/2013 | Jeong | ................... | H04B 7/0617 |
| | | | | 455/509 |

FOREIGN PATENT DOCUMENTS

| | | | |
|---|---|---|---|
| WO | 2011087274 A2 | 7/2011 | |
| WO | 2012130087 A1 | 10/2012 | |

OTHER PUBLICATIONS

TSG-RAN WG 1 #46, R1-062274, Tallinn, Estonia, Aug. 28-Sep. 1, 2006, Source: Ericsson, E-UTRA Scalability of Random Access Preamble With Cyclic Prefix, Agenda Item 8.3.1, Discussion and Decision, 8 pages.

International Search Report of PCT/CN2013/085819, dated Jan. 23, 2014.

* cited by examiner

METHOD FOR TRANSMITTING ENHANCED RANDOM ACCESS SEQUENCE AND MACHINE TYPE COMMUNICATION TERMINAL

TECHNICAL FIELD

The present document relates to the field of communications, and more particularly, to a method for transmitting an enhanced random access sequence and a machine type communication terminal.

BACKGROUND

A Machine Type Communication (referred to as MTC) user equipment (referred to as MTC UE), or called a machine type communication terminal (referred to as MTC terminal) or called a machine-to-machine (referred to as M2M) user communication device, is the main application form at the current stage of Internet of things. Low power consumption and low cost are an important guarantee for its large-scale applications. The M2M devices currently deployed in the market are mainly Global System of Mobile communication (referred to as GSM) based systems. In recent years, due to the high spectral efficiency of Long Term Evolution/Long Term Evolution-Advanced (referred to as LTE/LTE-A), more and more mobile operators select the LTE/LTE-A as an Evolution direction of the future broadband wireless communication system. The LTE/LTE-A based various M2M data services will be also more attractive. Only the cost of the LTE-M2M device is lower than that of a MTC terminal in the GSM system can the M2M service really transfer from the GSM to the LTE system.

Currently, the main alternatives for reducing the cost of a MTC terminal are reducing the number of receiving antennas in the terminal, reducing the baseband processing bandwidth of the terminal, reducing the peak rate supported by the terminal, using the half-duplex mode, and so on. However, the cost reduction means performance degradation, while the requirements on cell coverage of the LTE/LTE-A system cannot be reduced, therefore some measures need to be taken to achieve the requirements on the coverage performance of an existing LTE terminal when using a MTC terminal with the low-cost configuration. In addition, the MTC terminal may be located in the basement, corners, and other positions, in which case the scenario is worse than an ordinary LTE UE, and in order to compensate for the declining coverage caused by the penetration loss, some MTC terminals require higher performance enhancement, therefore the uplink and downlink coverage enhancement for some MTC terminals is necessary for this scenario, and how to ensure the user's access quality is the first issue to consider.

SUMMARY

To solve the technical problem, the present document is to provide a method for sending and receiving an enhanced random access sequence, to solve the problem that the access quality of a MTC terminal is poor.

To solve the abovementioned technical problem, the present document provides a method for transmitting an enhanced random access sequence, comprising: node 1 generating an enhanced random access sequence according to a random access sequence and an enhanced configuration information, and the node 1 sending the enhanced random access sequence on an enhanced random access channel.

Preferably, the abovementioned method may further have the following feature:

the enhanced configuration information comprises at least one of the following:

an arrangement mode information of the random access sequence, a resource allocation information of the enhanced random access channel.

Preferably, the abovementioned method may further have the following feature:

the arrangement mode information of the random access sequence comprises one of the following information:

repeatedly arranging the random access sequence for K times to constitute into the enhanced random access sequence, wherein K is an integer greater than 0;

generating L derived random access sequences based on the random access sequence according to a predetermined principle, wherein L is an integer greater than 0, arranging the random access sequence and the derived random access sequences in accordance with a predetermined order to constitute into a random access long sequence, repeatedly arranging the random access long sequence for T times to constitute into the enhanced random access sequence, wherein, T is an integer greater than 0.

Preferably, the abovementioned method may further have the following feature:

the random access sequence is one or more of random access sequences, which is preselected by the node 1.

Preferably, the abovementioned method may further have the following feature:

sequence lengths of the plurality of random access sequences are different.

Preferably, the abovementioned method may further have the following feature:

resource allocation information of the enhanced random access channel comprises at least one of the following: initial subframe index of the enhanced random access channel being n, and a resource allocation interval being m subframes.

Preferably, the abovementioned method may further have the following feature:

the resource allocation interval m belongs to a resource allocation interval set M, an index value of the resource allocation interval m in the resource allocation interval set M is configured in the node 1 and the node 2 by default, or sent by the node 2 to the node 1 via a signaling in advance, or indicated by an index information of the random access sequence.

Preferably, the abovementioned method may further have the following feature:

when the resource allocation interval m is indicated by the index information of the random access sequence, it comprises: the random access sequence being taken from a determined random access sequence set, wherein the determined random access sequence set corresponds to the resource allocation interval m.

Preferably, the abovementioned method may further have the following feature:

when a resource location subframe determined by the node 1 according to the resource allocation information of the enhanced random access channel is a downlink subframe, the resource location subframe is changed to a previous or next uplink subframe closest to the downlink subframe.

Preferably, the abovementioned method may further have the following feature:

the resource allocation information of the enhanced random access channel comprises: sending the enhanced random access sequence on a frame identified as e+q*p, wherein, e is the initial frame index of the resource of the enhanced random access channel, p is the resource allocation interval, and q=0, 1, . . . , $k^{Frame}$, wherein $k^{Frame}$ is the total number of frames occupied by the enhanced random access channel.

Preferably, the abovementioned method may further have the following feature:

a subframe index occupied by the enhanced random access channel in one frame is configured by the node 2 and sent to the node 1 or configured and stored in both the node 1 and the node 2 by default.

Preferably, the abovementioned method may further have the following feature:

the value of the resource allocation interval p belongs to a resource allocation interval set P, an index of the value of the resource allocation interval p in the resource allocation interval set P is configured in the node 1 and the node 2 by default, or sent by the node 2 to the node 1 through a signaling in advance, or indicated by the index information of the random access sequence.

Preferably, the abovementioned method may further have the following feature:

when the resource allocation interval p is indicated by the index information of the random access sequence, comprising: the random access sequence being taken from a determined random access sequence set, and the determined random access sequence set corresponds to the resource allocation interval p.

Preferably, the abovementioned method may further have the following feature:

the node 2 detects the enhanced random access sequence sent by the node 1 on the enhanced random access channel according to the enhanced configuration information.

Preferably, the abovementioned method may further have the following feature:

the node 1 is a machine type communication terminal or a non-machine type communication terminal;

the node 2 is one of a MacroCell, a MicroCell, a PicoCell, a Femtocell, and a Relay.

To solve the abovementioned technical problem, the present document provides a machine type communication terminal, and the machine type communication terminal comprises an enhanced random access sequence generation module and an enhanced random access sequence transmission module;

the enhanced random access sequence generation module is configured to: generate an enhanced random access sequence according to a random access sequence and an enhanced configuration information;

the enhanced random access sequence transmission module is configured to: transmit the enhanced random access sequence on an enhanced random access channel.

Preferably, the abovementioned machine type communication terminal may further have the following feature:

the enhanced configuration information comprises arrangement mode information of the random access sequence;

the enhanced random access sequence generation module is configured to: repeatedly arrange the random access sequence for K times according to the arrangement mode information to constitute into the enhanced random access sequence, wherein K is an integer greater than 0; or; generate L derived random access sequences based on the random access sequence according to a predetermined principle, wherein L is an integer greater than 0, and arrange the random access sequence and the derived random access sequences according to a predetermined order to constitute into a random access long sequence, and repeatedly arrange the random access long sequence for T times to constitute into the enhanced random access sequence, wherein, T is an integer greater than zero.

Preferably, the abovementioned machine type communication terminal may further have the following feature:

the enhanced configuration information comprises resource allocation information of the enhanced random access channel; the resource allocation information comprises at least one of the following: the initial subframe index of the enhanced random access channel being n, and the resource allocation interval being m subframes;

the enhanced random access sequence transmission module is configured to: determine resources for transmitting the enhanced random access sequence in an enhanced random access channel based on the resource allocation information of the enhanced random access channel; obtain an index of the value of the resource allocation interval m in a resource allocation interval set M from a default configuration or from the node 2.

Preferably, the abovementioned machine type communication terminal may further have the following feature:

the resource allocation information of the enhanced random access channel comprises: transmitting the enhanced random access sequence on a frame identified as e+q*p, wherein, e is the initial frame index of the resource of the enhanced random access channel, p is the resource allocation interval, and q=0, 1, . . . , $k^{Frame}$, wherein $k^{Frame}$ is the total number of frames occupied by the enhanced random access channel;

the enhanced random access sequence transmission module is configured to: determine resources used by the enhanced random access channel for transmitting the enhanced random access sequence according to the resource allocation information of the enhanced random access channel; obtain the index of the resource allocation interval p in the resource allocation interval set P from the default configuration or from the node 2.

The embodiment of the present document performs an enhanced design on the Physical Random Access Channel (PRACH) in the LTE/LTE-A system, to improve the access quality of a machine type communication terminal, and ensure that the machine type communication terminal can normally access the system.

PREFERRED EMBODIMENTS OF THE DOCUMENT

Hereinafter in conjunction with the accompanying drawings, the embodiments of the present document will be described in detail. It should be noted that, in the case of no conflict, embodiments and features in the embodiment of the present application may be combined randomly with each other.

Figure 1:
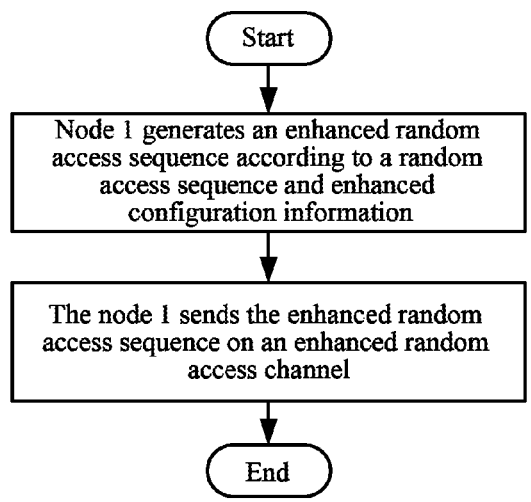
FIG. 1 is a schematic diagram of a method for transmitting an enhanced random access sequence.

As shown in FIG. 1, the method for transmitting enhanced random access sequence comprises: node 1 generating an enhanced random access sequence based on a random access sequence and enhanced configuration information, and the node 1 transmitting the enhanced random access sequence on an enhanced random access channel.

Wherein, the random access sequence may be preselected, and the random access sequence may be a random access sequence with standard default configuration, or a random access sequence specifically used to generate an enhanced random access sequence. Resources used by the enhanced random access channel can be resources used for transmitting the random access sequence according to the standard default configuration, or resources specifically used to transmit the enhanced random access sequence.

The enhanced configuration information at least comprises one of the following: arrangement mode information of the random access sequence, resource allocation information of the enhanced random access channel.

The arrangement mode information of the random access sequence comprises one of the following:

first, repeatedly arranging the random access sequence for K times to constitute into the enhanced random access sequence, wherein K is an integer greater than 0; for example, the value of K can be {0,1,4,10,20,30,50,80,100}, and K=0 indicates directly taking the random access sequence as an enhanced random access sequence.

Second, generating L derived random access sequences based on the random access sequence according to the predetermined principle, wherein L is an integer greater than 0, arranging the random access sequence and the derived random access sequences in accordance with a predetermined order to constitute into a random access long sequence, and repeatedly arranging the random access long sequence for T times to constitute into the enhanced random access sequence, wherein T is an integer greater than 0.

The arrangement mode information of the random access sequence can be configured in the node 1 and the node 2 by default, or sent by the node 2 to the node 1 via a signaling in advance.

The random access sequence is one or more of random access sequences, and sequence lengths of the plurality of random access sequences may be different.

A first enhanced random access channel resource allocation scheme:

the resource allocation information of the enhanced random access channel comprises at least one of the following: the initial subframe index of the enhanced random access channel being n, and the resource allocation interval being m subframes.

Figure 2:
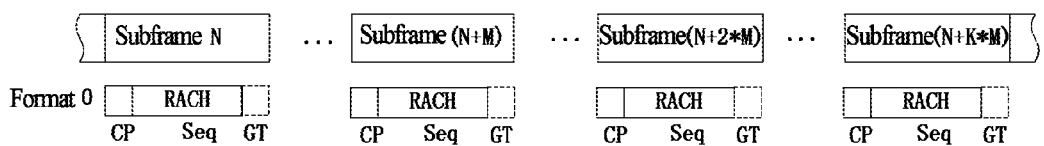
FIG. 2 is a schematic diagram of a first enhanced random access channel resource allocation.

As shown in FIG. 2, when the random access sequence is one random access sequence whose length occupies one subframe, the enhanced random access sequence is sent on a subframe identified as n+t*m, wherein, n is the initial subframe index of the enhanced random access channel, m is the resource allocation interval, t=0, 1, . . . , $k^{subframe}-1$, and $k^{subframe}$ is the total number of subframes occupied by the enhanced random access channel.

When the random access sequence is a plurality of random access sequences with different lengths, for example, one length occupies a subframe, and another length occupies 2 subframes, the initial subframe index of the enhanced random access channel is n, the position interval between the subframe at the ending position of sending the previous random access sequence or derived random access sequence and the subframe at the initial position of sending the next random access sequence or derived random access sequence is m.

The resource allocation interval m can belong to the resource allocation interval set M, when M comprises $N_{M_{subframe}}$ available resource allocation intervals, the index value of the resource allocation interval m in the resource allocation interval set M is configured in the node 1 and the node 2 by default, or sent by the node 2 to the node 1 via a signaling in advance, or indicated by the index information of the random access sequence. Alternatively, the resource allocation interval m may be indicated by the index information of the random access sequence, the random access sequence is taken from a determined random access sequence set, and the determined random access sequence set corresponds to the resource allocation interval m.

When the resource location subframe determined by the node 1 according to the resource allocation information of the enhanced random access channel is a downlink subframe, the node 1 changes the resource location subframe to the previous or next uplink subframe closest to the downlink subframe, wherein, the closest previous or next uplink subframe is not in the subframe set restricted by the above-mentioned resource allocation information.

Figure 3:
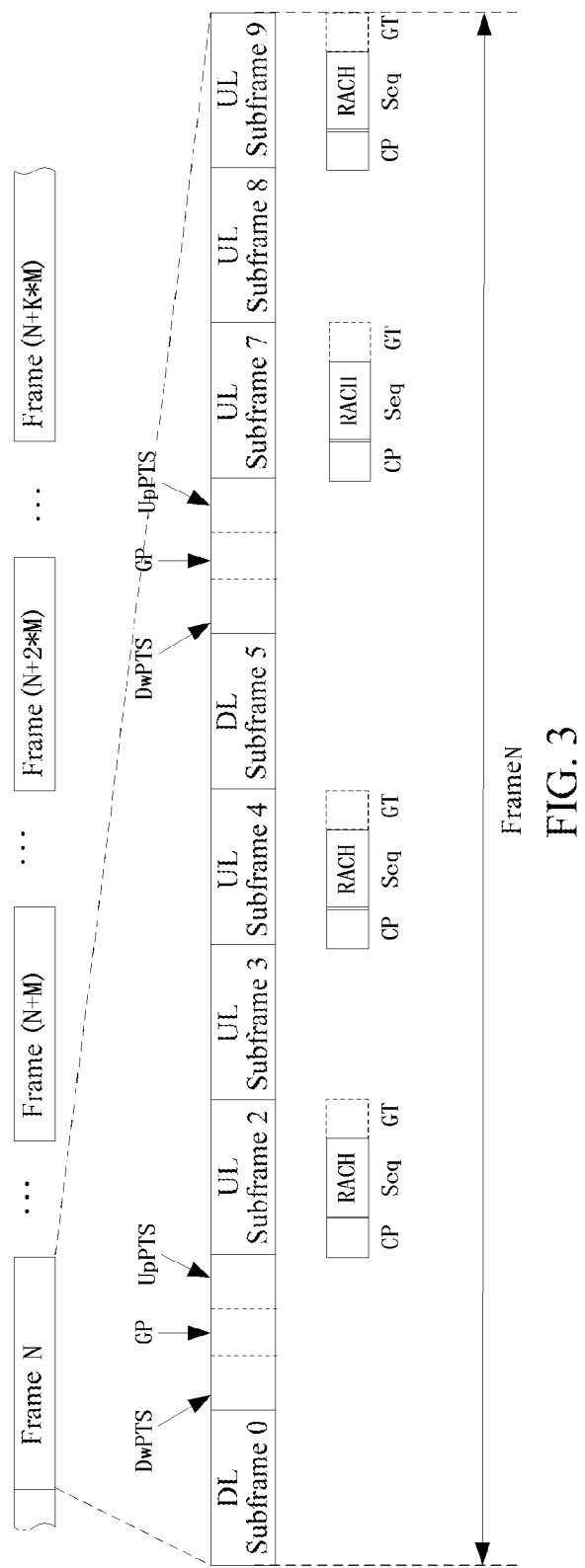
FIG. 3 is a schematic diagram of a second enhanced random access channel resource allocation.

A second enhanced random access channel resource allocation scheme:

as shown in FIG. 3, the resource allocation information of an enhanced random access channel comprises: transmitting the enhanced random access sequence on a frame identified as e+q*p, wherein, e is the initial frame index of the resource of the enhanced random access channel, p is the resource allocation interval, q=0, 1, . . . , $k^{Frame}$, and $k^{Frame}$ is the total number of frames occupied by the enhanced random access channel.

The subframe index of the enhanced random access channel occupied in one frame is configured by the node 2 and sent to the node 1 or configured and stored in the nodes 1 and 2 by default.

When the frame comprises a special subframe, the special subframe may also be used to transmit the enhanced random access sequence.

The value of the resource allocation interval p may belong to the resource allocation interval set P, the index of the value of the resource allocation interval p in the resource allocation interval set P is configured in the node 1 and the node 2 by default, or sent by the node 2 to the node 1 via a signaling in advance, or indicated by the index information of the random access sequence. Alternatively, when the value of the resource allocation interval p may be indicated by the index information of the random access sequence, it comprises: the random access sequence being taken from a determined random access sequence set, and the determined random access sequence set corresponding to the resource allocation interval p.

In the present method, a random access sequence or a derived random access sequence is transmitted at the resource location (each subframe or each frame) of the enhanced random access channel resource.

The node 2 in the present method detects the enhanced random access sequence transmitted by the node 1 on the enhanced random access channel according to the enhanced configuration information.

The node 1 is a machine type communication terminal or a non-machine type communication terminal.

The node 2 is one of a MacroCell, a MicroCell, a PicoCell, a Femtocell, and a Relay.

The machine type communication terminal in the present scheme comprises an enhanced random access sequence generation module and an enhanced random access sequence transmission module;

the enhanced random access sequence generation module is used to generate an enhanced random access sequence based on a random access sequence and enhanced configuration information;

the enhanced random access sequence transmission module is used to transmit the enhanced random access sequence on an enhanced random access channel.

The enhanced configuration information comprises arrangement mode information of the random access sequence;

the enhanced random access sequence generation module is used to repeatedly arrange K of the random access sequences according to the arrangement mode information to constitute into the enhanced random access sequence, wherein K is an integer greater than 0; or; generate L derived random access sequences based on the random access sequence in accordance with the predetermined principle, wherein L is an integer greater than 0, arrange the random access sequence and the derived random access sequences in accordance with a predetermined order to constitute into a random access long sequence, and repeatedly arrange the random access long sequence for T times to constitute into the enhanced random access sequence, wherein, T is an integer greater than 0.

The enhanced configuration information comprises resource allocation information of the enhanced random access channel; the resource allocation information comprises: transmitting the enhanced random access sequence on the subframe identified as n+t*m, wherein, n is the initial subframe index of the enhanced random access channel, m is the resource allocation interval, t=0, 1, ..., $k^{subframe}-1$, and $k^{subframe}$ is the total number of subframes occupied by the enhanced random access channel;

the enhanced random access sequence transmission module is used to determine resources used for transmitting the enhanced random access sequence in the enhanced random access channel according to the resource allocation information of the enhanced random access channel; also used to obtain an index of the value of the resource allocation interval m in the resource allocation interval set M from the default configuration or from the node 2.

The resource allocation information of the enhanced random access channel comprises: transmitting the enhanced random access sequence on the frame identified as e+q*p, wherein, e is the initial frame index of the resource of the enhanced random access channel, p is the resource allocation interval, q=0, 1, ..., $k^{Frame}$, and $k^{Frame}$ is the total number of frames occupied by the enhanced random access channel;

the enhanced random access sequence transmission module is used to determine the resources used by the enhanced random access channel for transmitting the enhanced random access sequence according to the resource allocation information of the enhanced random access channel; also used to obtain the index of the resource allocation interval p in the resource allocation interval set P from the default configuration or from the node 2.

In the following, specific embodiments are used to describe the present scheme in detail.

The First Specific Embodiment

The present specific embodiment corresponds to the first enhanced random access channel resource allocation scheme, the first random access sequence arrangement mode, the high-layer configuration parameter value, and the random access sequence being one random access sequence.

In a wireless communication system, there are the node 1 and the node 2 in the network, wherein, the typical node 1 is a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in existing network, and it needs to enhance the link performance thereof, and a scheme for enhancing a random access channel will be described in detail in the following:

1, the random access sequence allocated by the system to the MTC terminal for generating an enhanced random access sequence can be a random access sequence taken from a non-MTC terminal, or can be a random access sequence (different from the random access sequence taken from the non-MTC terminal) specifically used to generate an enhanced random access sequence.

In the present specific embodiment, the MTC terminal is UE1, the random access sequence obtained by the UE1 is LC_Preamble_1 and is a random access sequence taken from the non-MTC terminal, in a variant of the present specific embodiment, it may also be taken from the random access sequences specifically used to generate an enhanced random access sequence (different from the random access sequence taken from the non-MTC terminal).

2, the UE1 needs to repeat the LC_Preamble_1 for K times to constitute into the enhanced random access sequence E_Preamble_1. Wherein, the value of K can be configured in the UE1 and the node 2 by default, or sent by the node 2 to the UE1 via a signaling.

In the present specific embodiment, assume that the value of K may be {0,1,4,10,20,30,50,80,100}, and the node 2 sends the specific value of its K, e.g. K=10, to the UE1 in advance via a downlink signaling.

The interval between two repeats of the LC_Preamble_1 is m subframes, wherein, the value of m can be configured in the UE1 and the node 2 by default, or sent by the node 2 to the UE1 via a signaling.

In the present specific embodiment, assume that the value of m can be {1,2,4,6,8,10}, and the node 2 sends the specific value of its m, e.g., m=2, to the UE1 in advance via a downlink signaling.

Figure 4:
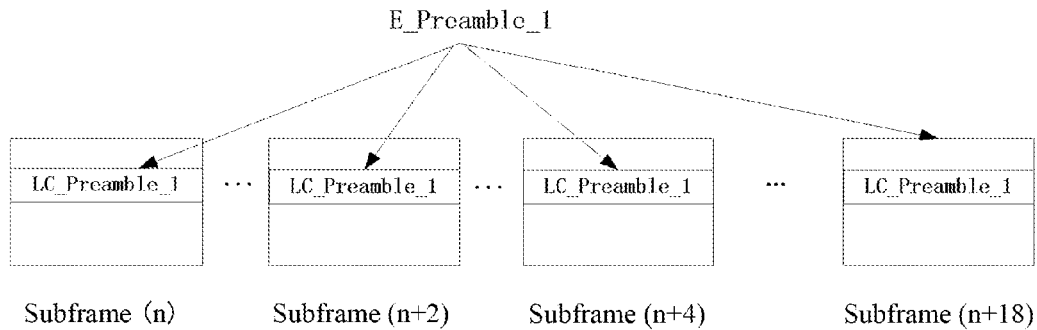
FIG. 4 is a schematic diagram of an enhanced random access channel resource allocation in accordance with the specific embodiments 1 and 3.

3, the schematic diagram of transmitting the enhanced random access sequence E_Preamble_1 on the enhanced random access channel is shown in FIG. 4; wherein, the resources occupied by the E_Preamble_1 in each subframe can be the same as the resources used by the UE when transmitting the random access sequence, or occupy the resources (different from the existing resources used by the UE when transmitting the random access sequence) specifically allocated to the enhanced random access sequence. Moreover, the resource location occupied by the E_Preamble_1 in each subframe may be the same or different.

When the resource allocation location of the enhanced random access channel determined by the UE1 according to the interval of m subframes is a downlink subframe, the resource location subframe is changed to the previous or next uplink subframe closest to the downlink subframe, wherein, the closest previous or next uplink subframe is not in a subframe set corresponding to n and m.

In the present specific embodiment, the resources used by the E_Preamble_1 are resources specifically allocated to the enhanced random access sequence, and the resource location of the E_Preamble_1 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1 information sent by the UE1.

The Second Specific Embodiment

This second specific embodiment corresponds to the first enhanced random access channel resource allocation scheme, the second random access sequence arrangement mode, the high-layer configuration parameter value, and the random access sequence being one random access sequence.

In a wireless communication system, there are the node 1 and the node 2 in the network, wherein, the node 1 may be a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in existing network, and there are needs to enhance the link performance thereof, in the following, a scheme for enhancing a random access channel will be described in detail:

1, the random access sequence allocated by the system to the MTC terminal for generating an enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is UE1, the random access sequence obtained by the UE1 is LC_Preamble_1, a random access sequence taken from the non-MTC terminal, and in a variant of the present specific embodiment, it can also be taken from the random access sequences (different from the random access sequence taken from the non-MTC terminal) specifically used to generate the enhanced random access sequence.

2, the UE1 needs to generate L derived random access sequences according to the LC_Preamble_1 to constitute into the enhanced random access sequence E_Preamble_1. Wherein, the value of L can be configured in the UE1 and the node 2 by default, or sent by the node 2 to the UE1 via a signaling.

In the present specific embodiment, assume that the value of L may be {0,1,4,10,20,30,50,80,100}, and the node 2 sends the specific value of its L, e.g. L=10, to the UE1 in advance via a downlink signaling.

Based on the predefined principle, the LC_Preamble_1 obtains 10 derived random access sequences specifically used to generate the enhanced random access sequence, the 10 derived random access sequences may comprise the LC_Preamble_1, and in the present specific embodiment, assume that the generated 10 sequences are respectively LC_Preamble_1, LC_Preamble_3, LC_Preamble_2, LC_Preamble_5, LC_Preamble_8, LC_Preamble_14, LC_Preamble_7, LC_Preamble_9, LC_Preamble_11, and LC_Preamble_4.

The resource allocation interval is m subframes, wherein, the value of m can be configured in the UE1 and the node 2 by default, or sent by the node 2 to the UE1 via a signaling.

In the present specific embodiment, assume that the value of m can be {1,2,4,6,8,10}, and the node 2 sends the specific value of its m, e.g., m=2, to the UE1 in advance via a downlink signaling.

If the resource allocation location of the enhanced random access channel determined by the UE1 according to the interval of m subframes is a downlink subframe, the resource location subframe is changed to the previous or next uplink subframe closest to the downlink subframe. Wherein, the closest previous or next uplink subframe is not in the subframe set corresponding to n and m.

Figure 5:
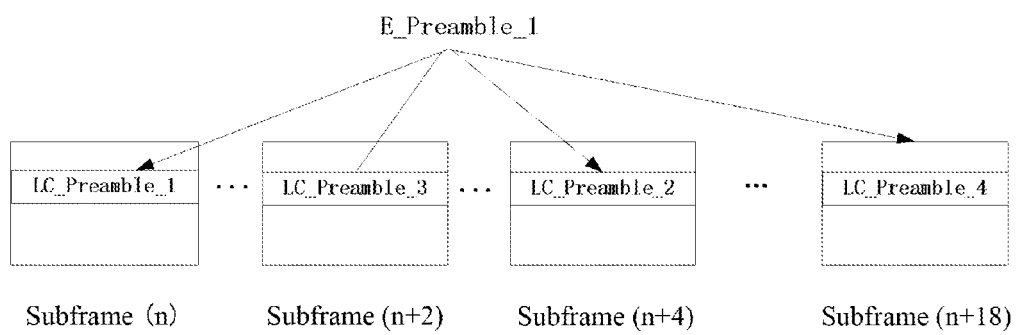
FIG. 5 is a schematic diagram of an enhanced random access channel resource allocation in accordance with the specific embodiments 2 and 4.

3, the schematic diagram of transmitting the enhanced random access sequence E_Preamble_1 on the enhanced random access channel is shown in FIG. 5; wherein, the resources occupied by the E_Preamble_1 in each subframe can be the same as the resources used by the UE for transmitting a random access sequence, or occupy the resources (different from the same resources used by the UE for transmitting the random access sequence) specifically allocated to the enhanced random access sequence. Moreover, the resource location occupied by the E_Preamble_1 in each subframe may be the same or different.

In the present specific embodiment, the resources used by the E_Preamble_1 are resources specifically allocated to the enhanced random access sequence, and the resource location of the E_Preamble_1 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1 information sent by the UE1.

The Third Specific Embodiment

This third specific embodiment corresponds to the first enhanced random access channel resource allocation scheme, the first random access sequence arrangement mode, the sequence index indication parameter value, and the random access sequence being one random access sequence.

In one wireless communication system, there are the node 1 and the node 2 in the network, wherein, the node 1 may be a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in existing network, and it needs to enhance the link performance thereof, in the following, a scheme for enhancing the random access channel will be described in detail:

1, the random access sequence allocated by the system to the MTC terminal for generating an enhanced random access sequence can be a random access sequence taken from a non-MTC terminal, or can be a random access sequence (different from the random access sequence taken from the non-MTC terminal) specifically used to generate the enhanced random access sequence.

In the present specific embodiment, the MTC terminal is the UE1, the random access sequence obtained by the UE1 is LC_Preamble_1, a random access sequence taken from the non-MTC terminal, and in a variant of the present specific embodiment, it can also be taken from random access sequences (different from the random access sequence taken from the non-MTC terminal) specifically used to generate the enhanced random access sequence.

2, the UE1 needs to repeat the LC_Preamble_1 for K times to constitute into the enhanced random access sequence E_Preamble_1. Wherein, the value of K can be indicated by the index information of the LC_Preamble_1.

the random access sequences allocated to the MTC terminal for generating an enhanced random access sequence are divided into N groups, and each group comprises one or more of random access sequences used to generate the enhanced random access sequence, and the MTC terminal randomly selects one sequence from the corresponding group as the random access sequence for generating the enhanced random access sequence in accordance with the required number of repetitions. In the present specific embodiment, the UE1 selects the LC_Preamble_1, and the corresponding number of repetitions is K=10.

The interval between two repeats of the LC_Preamble_1 is m subframes, wherein, the value of m can be configured in the UE1 and the node 2 by default, or sent by the node 2 to the UE1 via a signaling.

In the present specific embodiment, the value of the resource allocation interval m is indicated by the index information of the LC_Preamble_1, and the random access sequence group where the LC_Preamble_1 is located corresponds to one value of the m, such as m=2.

3, the schematic diagram of transmitting the enhanced random access sequence E_Preamble_1 on the enhanced random access channel is shown in FIG. 4; wherein, the resources occupied by the E_Preamble_1 in each subframe can be the same as the resources used by the UE for transmitting a random access sequence, or occupies the resources (different from the same resource used by the UE for transmitting the random access sequence) specifically allocated to the enhanced random access sequence. Moreover, the resource location occupied by the E_Preamble_1 in each subframe may be the same or different.

In the present specific embodiment, the resources used by the E_Preamble_1 are resources specifically allocated to the enhanced random access sequence, and the resource location of the E_Preamble_1 in each subframe is the same.

If the resource allocation location of the enhanced random access channel determined by the UE1 in accordance with the interval of m subframes is a downlink subframe, the resource location subframe is changed to the previous or next uplink subframe closest to the downlink subframe. Wherein, the closest previous or next uplink subframe is not in the subframe set corresponding to n and m.

4, since the node 2 already knew the resource location information of the enhanced random access channel and the constitution mode of the enhanced random access sequence, the node 2 can directly receive and detect on the enhanced random access channel to obtain the E_Preamble_1 information sent by the UE1.

The Fourth Specific Embodiment

The fourth specific embodiment corresponds to the first enhanced random access channel resource allocation scheme, the second random access sequence arrangement mode, the sequence index indication parameter value, and the random access sequence being one random access sequence.

In one wireless communication system, there are the node 1 and the node 2 in the network, wherein, the node 1 may be a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in existing network, and it needs to enhance the link performance thereof, and in the following, a scheme for enhancing the random access channel will be described in detail:

1, the random access sequence allocated by the system to the MTC terminal for generating an enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is the UE1, the random access sequence obtained by the UE1 is LC_Preamble_1, a random access sequence taken from the non-MTC terminal, and in a variant of the present specific embodiment, it can also be taken from the random access sequences (different from the random access sequence taken from the non-MTC terminal) specifically used to generate the enhanced random access sequence.

2, the UE1 needs to generate L derived random access sequences according to the LC_Preamble_1 to constitute into the enhanced random access sequence E_Preamble_1. Wherein, the value of L can be indicated by the index information of the LC_Preamble_1.

The random access sequences allocated to the MTC terminal for generating the enhanced random access sequence are divide into N groups, and each group comprises one or more of random access sequences used to generate the enhanced random access sequence, the MTC terminal randomly selects one sequence from the corresponding group as the random access sequence for generating the enhanced random access sequence in accordance with the required number of repetitions. In the present specific embodiment, the UE1 selects the LC_Preamble_1, and the corresponding L value is 10.

Based on the predefined principle, the LC_Preamble_1 obtains 10 derived random access sequences specifically used to generate the enhanced random access sequence, the 10 derived random access sequences may comprise the LC_Preamble_1, and in the present specific embodiment, assume that the generated 10 sequences are respectively the LC_Preamble_1, the LC_Preamble_3, the LC_Preamble_2, the LC_Preamble_5, the LC_Preamble_8, the LC_Preamble_14, the LC_Preamble_7, the LC_Preamble_9, the LC_Preamble_11, and the LC_Preamble_4.

The resource allocation interval is m subframes, wherein the value of m can be configured in the UE1 and the Node 2 by default or sent by the node 2 to the UE1 via a signaling.

In the present specific embodiment, assume that the value of m may be {1,2,4,6,8,10}, and the value of m is indicated by the index information of the LC_Preamble_1, and the random access sequence group where the LC_Preamble_1 is located corresponds to a value of the m, e.g., m=2.

If the resource allocation location of the enhanced random access channel determined by the UE1 in accordance with the interval of m subframes is a downlink subframe, the resource location subframe is changed to the previous or next uplink subframe closest to the downlink subframe. Wherein, the closest previous or next uplink subframe is not in the subframe set corresponding to n and m.

3, the schematic diagram of transmitting the enhanced random access sequence E_Preamble_1 on the enhanced random access channel is shown in FIG. 5; wherein, the resources occupied by the E_Preamble_1 in each subframe can be the same as the resources used by the UE for transmitting a random access sequence, or occupy the resources (different from the same resources used by the UE for sending the random access sequence) specifically allocated to the enhanced random access sequence. Moreover, the resource location occupied by the E_Preamble_1 in each subframe may be the same or different.

In the present specific embodiment, the resources used by the E_Preamble_1 are the resources specifically allocated to the enhanced random access sequence, and the resource location of the E_Preamble_1 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1 information sent by the UE1.

The Fifth Specific Embodiment

This fifth specific embodiment corresponds to the second enhanced random access channel resource allocation scheme, the first random access sequence arrangement mode, the high-layer configuration parameter value, and the random access sequence being one random access sequence.

In one wireless communication system, there are the node 1 and the node 2 in the network, wherein, the node 1 may be a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in existing network, and it needs to enhance the link performance thereof, and in the following, a scheme for enhancing the random access channel will be described in detail:

1, the random access sequence allocated by the system to the MTC terminal for generating an enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is the UE1, the random access sequence obtained by the UE1 is LC_Preamble_1, a random access sequence taken from the non-MTC terminal, and in a variant of the present specific embodiment, it can also be taken from random access sequences (different from the random access sequence taken from the non-MTC terminal) specifically used to generate the enhanced random access sequence.

2, the UE1 needs to repeat the LC_Preamble_1 for K times to constitute into the enhanced random access sequence E_Preamble_1. Wherein, the value of K can be configured in the UE1 and the node 2 by default or sent by the node 2 to the UE1 via a signaling.

In the present specific embodiment, assume that the value of K may be {0,1,4,10,20,30,50,80,100}, and the node 2 sends the specific value of its K, e.g. K=10, to the UE1 in advance via a downlink signaling.

Figure 6:
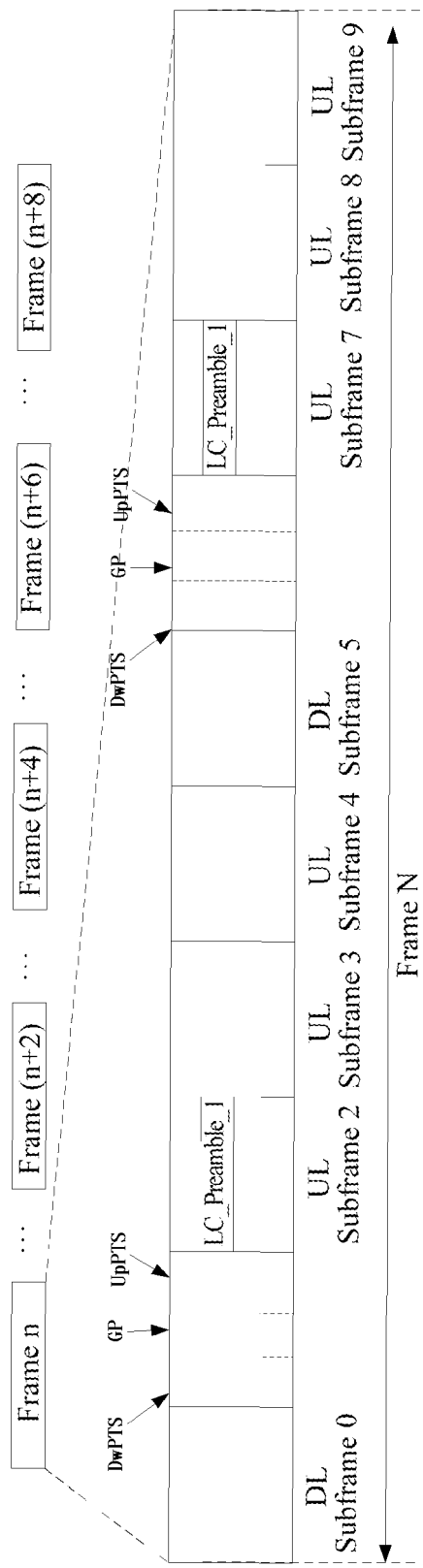
FIG. 6 is a schematic diagram of an enhanced random access channel resource allocation in accordance with the specific embodiments 5 and 7.

3, the schematic diagram of transmitting the enhanced random access sequence E_Preamble_1 on the enhanced random access channel is shown in FIG. 6; the E_Preamble_1 occupies the subframes: UL subframe2 and UL subframe7 in each Frame, so a total of five Frames are needed to transmit the E_Preamble_1. The Frame interval for transmitting the E_Preamble_1 is 2 Frames. Wherein, the information of subframes occupied by the E_Preamble_1 in each Frame and the information of Frame interval for transmitting the E_Preamble_1 are configured in the UE1 and the node 2 by default, or sent by the node 2 to the UE1 via a downlink signaling.

Furthermore, the information of subframes occupied by the E_Preamble_1 in each Frame and/or the information of Frame interval for transmitting the E_Preamble_1 may also be indicated by the index information of the LC_Preamble_1, the random access sequence group where the LC_Preamble_1 is located corresponds to the configuration information of the subframes occupied by the E_Preamble_1 in each Frame and/or the information of the Frame interval for transmitting the E_Preamble_1.

The resources occupied by the E_Preamble_1 can be same resources used by the UE for transmitting the random access sequence, or occupies the resources (different from the same resources used by the UE for transmitting the random access sequence) specifically allocated to the enhanced random access sequence. Moreover, the resource location occupied by the E_Preamble_1 in each subframe may be the same or different.

In the present specific embodiment, the resources used by the E_Preamble_1 are the resources specifically allocated to the enhanced random access sequence, and the resource location of the E_Preamble_1 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1 information sent by the UE1.

The Sixth Specific Embodiment

The sixth specific embodiment corresponds to the second enhanced random access channel resource allocation scheme, the second random access sequence arrangement mode, the high-layer configuration parameter value, and the random access sequence being one random access sequence.

In one wireless communication system, there are the node 1 and the node 2 in the network, wherein, the node 1 may be a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating an enhanced random access sequence can be a random access sequence taken from the non-MTC terminal, or can be a random access sequence (different from the random access sequence taken from the non-MTC terminal) specifically used to generate the enhanced random access the sequence.

In the present specific embodiment, the MTC terminal is the UE1, the random access sequence obtained by the UE1 is LC_Preamble_1, a random access sequence taken from the non-MTC terminal, and in a variant of the present specific embodiment, it can also be a random access sequence (different from the random access sequence taken from the non-MTC terminal) specifically used to generate the enhanced random access sequence.

2, the UE1 needs to generate L derived random access sequences according to the LC_Preamble_1 to constitute into the enhanced random access sequence E_Preamble_1. Wherein, the value of L can be configured in the UE1 and the node 2 by default, or sent by the node 2 to the UE1 via a signaling.

In the present specific embodiment, assume that the value of L can be {0,1,4,10,20,30,50,80,100}, and the node 2 sends the specific value of its L, such as L=10, to the UE1 via a downlink signaling.

Based on the predefined principle, the LC_Preamble_1 obtains 10 derived random access sequences specifically used to generate the enhanced random access sequence, and the 10 derived random access sequences may comprise the LC_Preamble_1.

Figure 7:
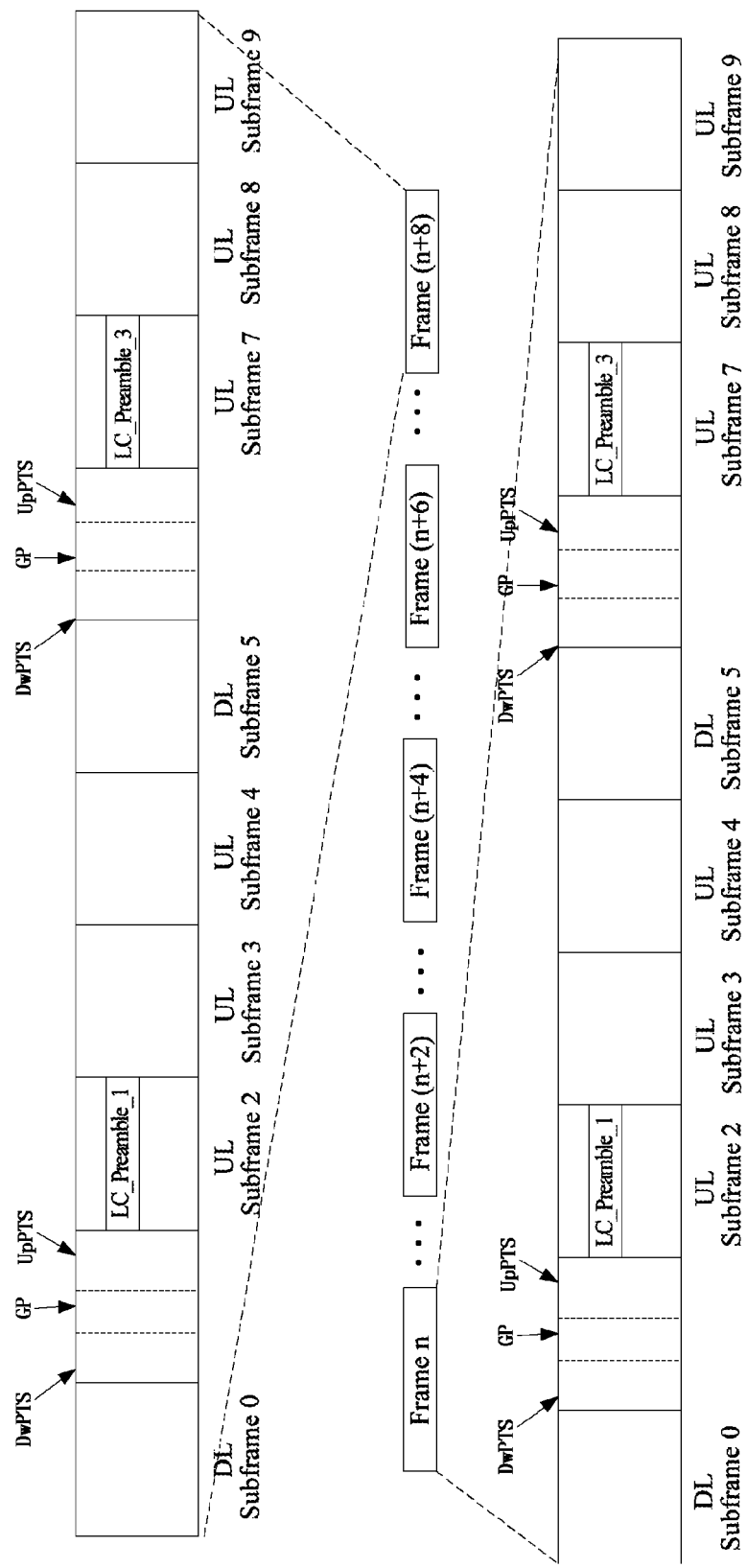
FIG. 7 is a schematic diagram of an enhanced random access channel resource allocation in accordance with the specific embodiments 6 and 8.

3, the schematic diagram of transmitting the enhanced random access sequence E_Preamble_1 on the enhanced random access channel is shown in FIG. 7, the E_Preamble_1 occupies the subframes UL subframe2 and UL subframe7 in each Frame, so a total of five Frames are needed to send the E_Preamble_1. The Frame interval for transmitting the E_Preamble_1 is 2 Frames. Wherein, the information of subframes occupied by the E_Preamble_1 in each Frame and the information of Frame interval for transmitting the E_Preamble_1 are configured in the UE1 and the node 2 by default, or sent by the node 2 to the UE1 via a downlink signaling.

The 10 sequences used for generating the E_Preamble_1 are respectively the LC_Preamble_1, the LC_Preamble_3, the LC_Preamble_1, the LC_Preamble_3, the LC_Preamble_1, the LC_Preamble_3, the LC_Preamble_1, the LC_Preamble_3, the LC_Preamble_1, and the LC_Preamble_3, that is, the random access sequences transmitted in the Frame can be different, and then are repeated in the respective Frames.

The 10 sequences used for generating the E_Preamble_1 are respectively the LC_Preamble_1, the LC_Preamble_3, the LC_Preamble_2, the LC_Preamble_4, the LC_Preamble_5, the LC_Preamble_8, the LC_Preamble_9, the LC_Preamble_10, the LC_Preamble_7, and the LC_Preamble_13, that is, the random access sequences transmitted within the Frame and between the Frames can be different.

The 10 sequences used for generating the E_Preamble_1 can also be the LC_Preamble_1, the LC_Preamble_1, the LC_Preamble_3, the LC_Preamble_3, the LC_Preamble_5, the LC_Preamble_5, the LC_Preamble_7, the LC_Preamble_7, the LC_Preamble_9, and the LC_Preamble_9, that is, the random access sequences sent within the Frame are the same, and the random access sequences sent between the Frames may be different.

Furthermore, the information of subframes occupied by the E_Preamble_1 in each Frame and/or the information of Frame interval for transmitting the E_Preamble_1 may also be indicated by the index information of the LC_Preamble_1, and the random access sequence group where the LC_Preamble_1 is located corresponds to the configuration information of the subframes occupied by the E_Preamble_1 in each Frame and/or the information of Frame interval for transmitting the E_Preamble_1.

The resources used by the E_Preamble_1 may be the same resources used by the UE for transmitting the random access sequence, or occupy the resources (different from the same resources used by the UE for transmitting the random access sequence) specifically allocated to the enhanced random access sequence. Moreover, the resource location occupied by the E_Preamble_1 in each subframe may be the same or different.

In the present specific embodiment, the resources used by the E_Preamble_1 are the resources specifically allocated to the enhanced random access sequence, and the resource location of the E_Preamble_1 in each subframe is the same.

4, since the Node 2 already knew the resource location information of the enhanced random access channel and the constitution mode of the enhanced random access sequence, the node 2 can directly receive and detect on the enhanced random access channel to obtain the E_Preamble_1 information sent by the UE1.

The Seventh Specific Embodiment

The seventh specific embodiment corresponds to the second enhanced random access channel resource allocation scheme, the first random access sequence arrangement mode, the sequence index parameter value, and the random access sequence being one random access sequence.

In one wireless communication system, there are the node 1 and the node 2 in the network, wherein, the node 1 may be a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating an enhanced random access sequence can be a random access sequence taken from the non-MTC terminal, or can be a random access sequence (different from the random access sequence taken from the non-MTC terminal) specifically used to generate the enhanced random access the sequence.

In the present specific embodiment, the MTC terminal is the UE1, the random access sequence obtained by the UE1 is LC_Preamble_1, a random access sequence taken from the non-MTC terminal, and in a variant of the present specific embodiment, it can be a random access sequence (different from the random access sequence taken from the non-MTC terminal) specifically used to generate the enhanced random access sequence.

2, the UE1 needs to repeat the LC_Preamble_1 for K times to constitute into the enhanced random access sequence E_Preamble_1. Wherein, the value of K is indicated by the index information of the LC_Preamble_1.

The random access sequences allocated to the MTC terminal for generating the enhanced random access sequence are divided into N groups, and each group comprises one or more of random access sequences used to generate the enhanced random access sequence, the MTC terminal randomly selects one sequence from the corresponding group as the random access sequence for generating the enhanced random access sequence in accordance with the required number of repetitions. In the present specific embodiment, the UE1 selects the LC_Preamble_1, and the corresponding number of repetitions is K=10.

3, the schematic diagram of transmitting the enhanced random access sequence E_Preamble_1 on the enhanced random access channel is shown in FIG. 6; the E_Preamble_1 occupies the subframes UL subframe2 and UL subframe7 in each Frame, therefore a total of five Frames are needed to send the E_Preamble_1. The Frame interval for transmitting the E_Preamble_1 is 2 Frames. Wherein, the information of subframes occupied by the E_Preamble_1 in each Frame and the information of Frame interval for transmitting the E_Preamble_1 are configured in the UE1 and the node 2 by default, or sent by the node 2 to the UE1 via a downlink signaling.

In addition, the information of subframes occupied by the E_Preamble_1 in each Frame and/or the information of Frame interval for transmitting the E_Preamble_1 may also be indicated by the index information of the LC_Preamble_1, the random access sequence group where the LC_Preamble_1 is located corresponds to the configuration information of the subframes occupied by the E_Preamble_1 in each frame and/or the information of the Frame interval for transmitting the E_Preamble_1.

The resources used by the E_Preamble_1 may be the same resources used by the UE for transmitting a random access sequence, or occupy the resources (different from the same resources used by the UE for transmitting the random access sequence) specifically allocated to the enhanced random access sequence. Moreover, the resource location occupied by the E_Preamble_1 in each subframe may be the same or different.

In the present specific embodiment, the resources used by the E_Preamble_1 are the resources specifically allocated to the enhanced random access sequence, the resource location of the E_Preamble_1 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1 information transmitted by the UE1.

The Eighth Specific Embodiment

The eighth specific embodiment corresponds to the second enhanced random access channel resource allocation scheme, the second random access sequence arrangement mode, the sequence index parameter value, and the random access sequence being one random access sequence.

In one wireless communication system, there are the node 1 and the node 2 in the network, wherein, the node 1 may be a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating an enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is the UE1, the random access sequence obtained by the UE1 is LC_Preamble_1, a random access sequence taken from the non-MTC terminal, and in a variant of the present specific embodiment, it can also be taken from the random access sequences (different from the random access sequence taken from the non-MTC terminal) specifically used to generate the enhanced random access sequence.

2, the UE1 needs to generate L derived random access sequences according to the LC_Preamble_1 to constitute into the enhanced random access sequence E_Preamble_1. Wherein, the value of L is indicated by the index information of the LC_Preamble_1.

The random access sequences allocated to the MTC terminal for generating the enhanced random access sequence are divided into N groups, and each group comprises one or more of random access sequences used to generate the enhanced random access sequence, the MTC terminal randomly selects one sequence from the corresponding group as the random access sequence for generating the enhanced random access sequence in accordance with the required number of repetitions. In the present specific embodiment, the UE1 selects the LC_Preamble_1, corresponding to L=10.

Based on the predefined principle, the LC_Preamble_1 obtains 10 derived random access sequences specifically used to generate the enhanced random access sequence, and the 10 derived random access sequences may comprise the LC_Preamble_1.

3, the schematic diagram of transmitting the enhanced random access sequence E_Preamble_1 on the enhanced random access channel is shown in FIG. 7, the E_Preamble_1 occupies the subframes UL subframe2 and UL subframe7 in each frame, so a total of five Frames are needed to send the E_Preamble_1. The Frame interval for transmitting the E_Preamble_1 is 2 Frames. Wherein, the information of subframes occupied by the E_Preamble_1 in each Frame and the information of Frame interval for transmitting the E_Preamble_1 are configured in the UE1 and the node 2 by default, or sent by the node 2 to the UE1 via a downlink signaling.

The 10 sequences used for generating the E_Preamble_1 are respectively the LC_Preamble_1, the LC_Preamble_3, the LC_Preamble_1, the LC_Preamble_3, the LC_Preamble_1, the LC_Preamble_3, the LC_Preamble_1, the LC_Preamble_3, the LC_Preamble_1, and the LC_Preamble_3, that is, the random access sequences transmitted within the Frame may be different and then are repeated in the respective Frames.

The 10 sequences used for generating the E_Preamble_1 are respectively the LC_Preamble_1, the LC_Preamble_3, the LC_Preamble_2, the LC_Preamble_4, the LC_Preamble_5, the LC_Preamble_8, the LC_Preamble_9, the LC_Preamble_10, the LC_Preamble_7, and the LC_Preamble_13, that is, the random access sequences sent within the Frame and between the Frames may be different.

The 10 sequences used for generating the E_Preamble_1 may also be the LC_Preamble_1, the LC_Preamble_1, the LC_Preamble_3, the LC_Preamble_3, the LC_Preamble_5, the LC_Preamble_5, the LC_Preamble_7, the LC_Preamble_7, the LC_Preamble_9, and the LC_Preamble_9, that is, the random access sequences transmitted within the Frame are the same, while the random access sequences sent between the Frames can be different.

Furthermore, the information of subframes occupied by the E_Preamble_1 in each Frame and/or the information of Frame interval for transmitting the E_Preamble_1 may also be indicated by the index information of the LC_Preamble_1, the random access sequence group where the LC_Preamble_1 is located corresponds to the configuration information of the subframes occupied by the E_Preamble_1 in each Frame and/or the information of the Frame interval for transmitting the E_Preamble_1.

The resources occupied by the E_Preamble_1 may be then same resources used by the UE for transmitting a random access sequence, or occupy the resources (different from the same resources used by the UE for transmitting the random access sequence) specifically allocated to the enhanced random access sequence. Moreover, the resource location occupied by the E_Preamble_1 in each subframe may be the same or different.

In the present specific embodiment, the resources used by the E_Preamble_1 are the resources specifically allocated to the enhanced random access sequence, and the resource location occupied by the E_Preamble_1 in each subframe may be the same or different.

4, since the node 2 already knew the resource location information of the enhanced random access channel and the constitution mode of the enhanced random access sequence, the node 2 can directly receive and detect on the enhanced random access channel to obtain the E_Preamble_1 information transmitted by the UE1.

The Ninth Specific Embodiment

The present specific embodiment corresponds to the first enhanced random access channel resource allocation scheme, the first random access sequence arrangement mode, the high-layer configuration parameter value, and the random access sequence being a plurality of random access sequences.

In one wireless communication system, there are the node 1 and the node 2 in the network, wherein, the node 1 is a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating the enhanced random access sequence may be a random access sequence taken from the non-MTC terminal, or may also be a random access sequence (different from the random access sequence taken from the non-MTC terminal) specifically used to generate the enhanced random access sequence.

In the present specific embodiment, the MTC terminal is the UE1, and the UE1 obtains more than one random access sequence, such as the LC_Preamble_1 and the LC_Preamble_2, random access sequences taken from the non-MTC terminal. Moreover, the sequence lengths of the LC_Preamble_1 and the LC_Preamble_2 can be different, for example, the LC_Preamble_1 and the LC_Preamble_2 can be from random access sequence sets with different formats in the non-MTC terminal.

2, the UE1 needs to repeat the LC_Preamble_1 and the LC_Preamble_2 for K times to constitute into the enhanced random access sequence E_Preamble_1&2. Where, the value of K can be configured in the UE1 and the node 2 by default, or sent by the node 2 to the UE1 via a signaling.

In the present specific embodiment, assume that the value of K may be {0,1,4,10,20,30,50,80,100}, and the node 2 sends the specific value of its K, such as K=10, to the UE1 in advance via a downlink signaling.

The interval of transmitting the LC_Preamble_1 and the LC_Preamble_2 which consist into the E_Preamble_1&2 and their repeated sequences is m subframes, wherein, the value of m can be configured in the UE1 and the node 2 by default or sent by the node 2 to the UE1 via a signaling.

In the present specific embodiment, assume that the value of m can be {1,2,4,6,8,10}, and the node 2 sends the specific value of its m, e.g., m=2, to the UE1 in advance via a downlink signaling.

If the resource allocation location of the enhanced random access channel determined by the UE1 in accordance with the interval of m subframes is a downlink subframe, the resource location subframe is changed to the previous or next uplink subframe closest to the downlink subframe. Wherein, the closest previous or next uplink subframe is not in the subframe set corresponding to n and m.

Figure 8:
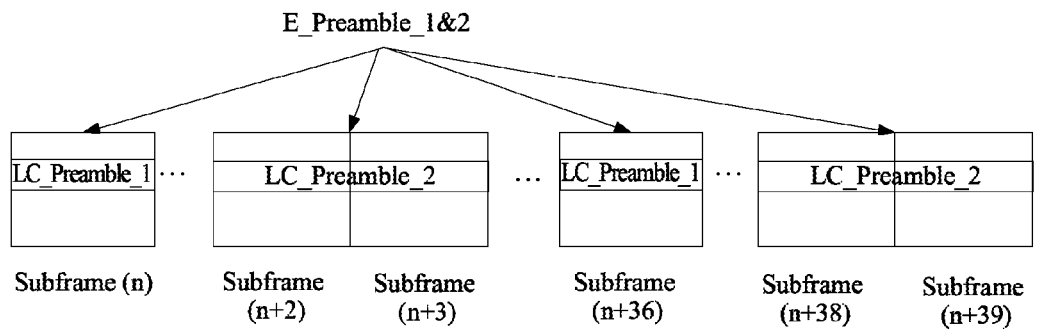
FIG. 8 is a schematic diagram of an enhanced random access channel resource allocation in accordance with the specific embodiments 9 and 11.

3, the schematic diagram of transmitting the enhanced random access sequence E_Preamble_1&2 on the enhanced random access channel is shown in FIG. 8, wherein the length of the LC_Preamble_1 is one subframe, and the length of the LC_Preamble_2 is two subframes. Wherein, the resources occupied by the E_Preamble_1 and the LC_Preamble_2 in each subframe can be the same resources used by the non-MTC UE for transmitting the random access sequence, or occupy the resources specifically allocated to the enhanced random access sequence. Moreover, the resource location occupied by the E_Preamble_1 and the LC_Preamble_2 in each subframe may be the same or different.

In the present specific embodiment, the resources used by the E_Preamble_1&2 are the resources specifically allocated to the enhanced random access sequence, and the resource location of the E_Preamble_1&2 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1&2 information sent by the UE1.

The Tenth Specific Embodiment

The tenth specific embodiment corresponds to the first enhanced random access channel resource allocation scheme, the second random access sequence arrangement mode, the high-layer configuration parameter value, and the random access sequence being a plurality of random access sequences.

In a wireless communication system, there are the node 1 and the node 2 in the network, wherein, the node 1 is a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating the enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is the UE1, and the UE1 obtains more than one random access sequence, such as the LC_Preamble_1 and the LC_Preamble_2, random access sequences taken from the non-MTC terminal. Moreover, the sequence lengths of the LC_Preamble_1 and the LC_Preamble_2 may be different, for example, the LC_Preamble_1 and the LC_Preamble_2 come from random access sequence sets with different formats in the non-MTC terminal.

2, the UE1 needs to generate L derived random access sequences according to the LC_Preamble_1 and the LC_Preamble_2 to constitute into the enhanced random access sequence E_Preamble_1&2. Wherein, the value of L can be configured in the UE1 and the node 2 by default, or sent by the node 2 to the UE1 via a signaling.

In the present specific embodiment, assume that the value of L can be {0,1,4,10,20,30,50,80,100}, and the node 2 sends the specific value of its L, such as L=10, to the UE1 via a downlink signaling.

Based on the predefined principle, the LC_Preamble_1 and the LC_Preamble_2 obtain 10 derived random access sequences specifically used to generate the enhanced random access sequence, the 10 derived random access sequences may comprise the LC_Preamble_1 and the LC_Preamble_2, and the sequence lengths of the derived random access sequences may be different, in the present specific embodiment, assume that the generated 10 sequences are respectively the LC_Preamble_1 (occupying one subframe), the LC_Preamble_2 (occupying two subframes), the LC_Preamble_3 (occupying two subframes), the LC_Preamble_5 (occupying one subframe), the LC_Preamble_8 (occupying one subframe), the LC_Preamble_14 (occupying two subframes), the LC_Preamble_7 (occupying one subframe), the LC_Preamble_9 (occupying one subframe), the LC_Preamble_11 (occupying one subframe), and the LC_Preamble_4 (occupying one subframe).

The resource allocation interval is m subframes, wherein, the value of m can be configured in the UE1 and the node 2 by default, or sent by the node 2 to the UE1 via a signaling.

In the present specific embodiment, assume that the value of m can be {1,2,4,6,8,10}, and the node 2 sends the specific value of its m, such as m=2, to the UE1 in advance via a downlink signaling.

If the resource allocation location of the enhanced random access channel determined by the UE1 in accordance with the interval of m subframe is a downlink subframe, the resource location subframe is changed to the previous or next uplink subframe closest to the downlink subframe. Wherein, the closest previous or next uplink subframe is not in the subframe set corresponding to n and m.

Figure 9:
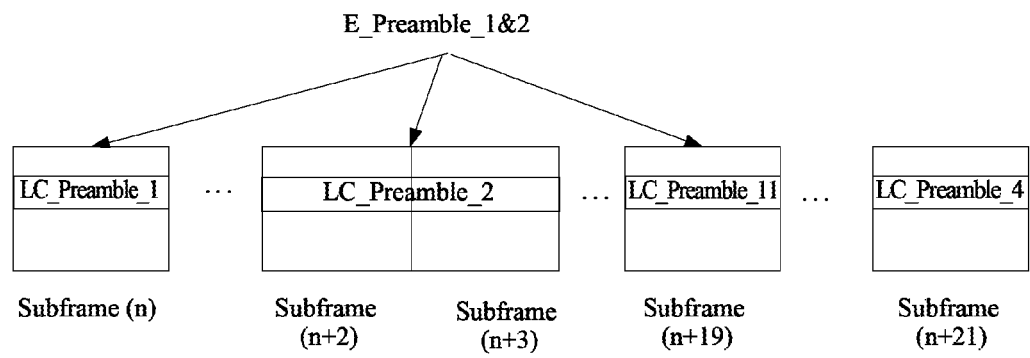
FIG. 9 is a schematic diagram of an enhanced random access channel resource allocation in accordance with the specific embodiments 10 and 12.

3, the schematic diagram of transmitting the enhanced random access sequence E_Preamble_1&2 on the enhanced random access channel is shown in FIG. 9; wherein, the resources occupied by the E_Preamble_1&2 in each subframe can be the same resources used by the non-MTC UE for transmitting the random access sequence, or occupy the resources specifically allocated to the enhanced random access sequence. Moreover, the resource location occupied by the E_Preamble_1&2 in each subframe may be the same or different.

In the present specific embodiment, the resources used by the E_Preamble_1&2 are the resources specifically allocated to the enhanced random access sequence, and the resource location of the E_Preamble_1&2 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1&2 information sent by the UE1.

The Eleventh Specific Embodiment

The eleventh specific embodiment corresponds to the first enhanced random access channel resource allocation scheme, the first random access sequence arrangement mode, the sequence index indication parameter value, and the random access sequence being a plurality of random access sequences.

In a wireless communication system, there are the node 1 and the node 2 in the network, wherein, the node 1 is a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating the enhanced random access sequence may be a random access sequence taken from the non-MTC terminal, or may be a random access sequence (different from the random access sequence taken from the non-MTC terminal) specifically used to generating the enhanced random access sequence.

In the present specific embodiment, the MTC terminal is the UE1, and the UE1 obtains more than one random access sequence, such as the LC_Preamble_1 and the LC_Preamble_2, random access sequences taken from the non-MTC terminal. Moreover, the sequence lengths of the LC_Preamble_1 and the LC_Preamble_2 may be different, for example, the LC_Preamble_1 and the LC_Preamble_2 come from random access sequence sets with different formats in the non-MTC terminal.

2, the UE1 needs to repeat the LC_Preamble_1 and the LC_Preamble_2 for K times to constitute into the enhanced random access sequence E_Preamble_1&2. Wherein, the value of K can be indicated by the index information of the LC_Preamble-1 and/or the LC_Preamble_2.

The random access sequences allocated to the MTC terminal for generating the enhanced random access sequence are divide into N groups, and each group comprises one or more of random access sequences used to generate the enhanced random access sequence, and each group corresponds to one repetition. In the present specific embodiment, the UE1 selects the LC_Preamble_1 and the LC_Preamble_2, assuming that they come from the same group, then the corresponding number of repetitions is: K=10.

In addition, the LC_Preamble_1 and the LC_Preamble_2 may also come from different groups, but the MTC UE and the node 2 need to agree in advance on the group corresponding to the number of repetitions K.

The interval of transmitting the LC_Preamble_1 and the LC_Preamble_2 which consist into the E_Preamble_1&2 and their repeated sequences is m subframes, wherein, the value of m can be configured in the UE1 and the Node 2 by default, or sent by the node 2 to UE1 via a signaling, or indicated by the index information of the LC_Preamble_1 and/or the LC_Preamble_2.

If the resource allocation location of the enhanced random access channel determined by the UE1 in accordance with the interval m subframe is a downlink subframe, the resource location subframe is changed to the previous or next uplink subframe closest to the downlink subframe. Wherein, the closest previous or next uplink subframe is not in the subframe set corresponding to n and m.

3, the schematic diagram of transmitting the enhanced random access sequence E_Preamble_1&2 on the enhanced random access channel is shown in FIG. 8, wherein the length of the LC_Preamble_1 is one subframe, and the length of the LC_Preamble_2 is two subframes. Wherein, the resources occupied by the E_Preamble_1 and the LC_Preamble_2 in each subframe can be same resources used by the non-MTC UE for transmitting a random access sequence, or occupy the resources specifically allocated to the enhanced random access sequence. Moreover, the resource location occupied by the E_Preamble_1 and the LC_Preamble_2 in each subframe may be the same or different.

In the present specific embodiment, the resources used by the E_Preamble_1&2 are the resources specifically allocated to the enhanced random access sequence, and the resource location of the E_Preamble_1&2 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1&2 information sent by the UE1.

The Twelfth Specific Embodiment

The twelfth specific embodiment corresponds to the first enhanced random access channel resource allocation scheme, the second random access sequence arrangement mode, the sequence index indication parameter value, and the random access sequence being a plurality of random access sequences.

In a wireless communication system, there are the node 1 and the node 2 in the network, wherein, the node 1 is a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating the enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is the UE1, and the UE1 obtains more than one random access sequence, such as the LC_Preamble_1 and the LC_Preamble_2, random access sequences taken from the non-MTC terminal. Moreover, the sequence lengths of the LC_Preamble_1 and the LC_Preamble_2 can be different, for example, the LC_Preamble_1 and the LC_Preamble_2 come from random access sequence sets with different formats in the non-MTC terminal.

2, the UE1 needs to generate L derived random access sequences according to the LC_Preamble_1 and the LC_Preamble_2 to constitute into the enhanced random access sequence E_Preamble_1&2. Wherein, the value of L can be indicated by the index information of the LC_Preamble_1 and/or the LC_Preamble_2.

The random access sequences allocated to the MTC terminal for generating the enhanced random access sequence are divided into N groups, and each group comprises one or more of random access sequences used to generate the enhanced random access sequence, and each group corresponds to one value of the L. In the present specific embodiment, the UE1 selects the LC_Preamble_1 and the LC_Preamble_2, assume that they come from the same group, then the corresponding L=10.

In addition, the LC_Preamble_1 and the LC_Preamble_2 may also come from different groups, but the MTC terminal and the node 2 need to agree on the group corresponding to the L in advance.

Based on the predefined principle, the LC_Preamble_1 and the LC_Preamble_2 obtain 10 derived random access sequences used to generate the enhanced random access sequence, the 10 derived random access sequences may comprise the LC_Preamble_1 and the LC_Preamble_2, and in the present specific embodiment, assume that the generated 10 sequences are respectively the LC_Preamble_1 (occupying one subframe), the LC_Preamble_2 (occupying two subframes), the LC_Preamble_3 (occupying two subframes), the LC_Preamble_5 (occupying one subframe), the LC_Preamble_8 (occupying one subframe), the LC_Preamble_14 (occupying two subframes), the LC_Preamble_7 (occupying one subframe), the LC_Preamble_9 (occupying one subframe), the LC_Preamble_11 (occupying one subframe), and the LC_Preamble_4 (occupying one subframe).

The resource allocation interval is m subframes, wherein, the value of m can be configured in the UE1 and the node 2 by default, or sent by the node 2 to the UE1 via a signaling, or indicated by the index information of the LC_Preamble_1 and/or the LC_Preamble_2.

If the resource allocation location of the enhanced random access channel determined by the UE1 in accordance with the interval of m subframe is a downlink subframe, the resource location subframe is changed to the previous or next uplink subframe closest to the downlink subframe. Wherein, the closest previous or next uplink subframe is not in the subframe set corresponding to n and m.

3, the schematic diagram of transmitting the enhanced random access sequence E_Preamble_1&2 on the enhanced random access channel is shown in FIG. 9; wherein the resources occupied by the E_Preamble_1&2 in each subframe can be the same resources used by the non-MTC UE for transmitting the random access sequence, or occupy the resources specifically allocated to the enhanced random access sequence. Moreover, the resource location occupied by the E_Preamble_1&2 in each subframe may be the same or different.

In the present specific embodiment, the resources used by the E_Preamble_1&2 are the resources specifically allocated to the enhanced random access sequence, and the resource location of the E_Preamble_1&2 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1&2 information sent by the UE1.

The Thirteenth Specific Embodiment

The thirteenth specific embodiment corresponds to the second enhanced random access channel resource allocation scheme, the first random access sequence arrangement mode, the high-layer configuration parameter value, and the random access sequence being a plurality of random access sequences.

In a wireless communication system, there are the node 1 and the node 2 in the network, wherein, the node 1 is a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating the enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is the UE1, and the UE1 obtains more than one random access sequence, such as the LC_Preamble_1 and the LC_Preamble_2, random access sequences taken from the non-MTC terminal. Moreover, the sequence lengths of the LC_Preamble_1 and the LC_Preamble_2 can be different, for example, the LC_Preamble_1 and the LC_Preamble_2 can come from random access sequence sets with different formats in the non-MTC terminal.

2, the UE1 needs to repeat the LC_Preamble_1 and the LC_Preamble_2 for K times to constitute into the enhanced random access sequences E_Preamble_1&2. Wherein, the value of K can be configured in the UE1 and the node 2 by default, or sent by the node 2 to the UE1 through a signaling.

In the present specific embodiment, assume that the value of K can be {0,1,5,10,20,30,50,80,100}, and the node 2 sends the specific value of its K, such as K=5, to the UE1 via a downlink signaling.

Figure 10:
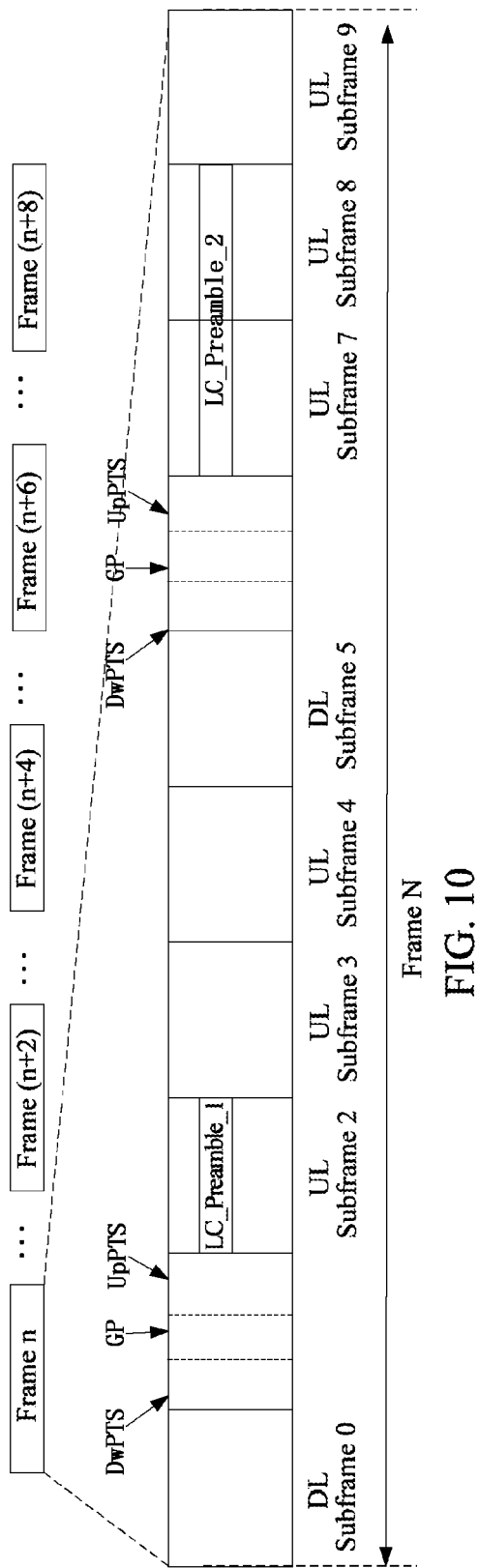
FIG. 10 is a schematic diagram of an enhanced random access channel resource allocation in accordance with the specific embodiments 13 and 14.

3, the schematic diagram of transmitting the enhanced random access sequence E_Preamble_1&2 on the enhanced random access channel is shown in FIG. 10; the E_Preamble_1&2 occupies the subframes UL subframe2, UL subframe7 and UL subframe8 in each frame, therefore a total of five Frames are needed to send the E_Preamble_1&2. The Frame interval for transmitting the E_Preamble_1 is 2 Frames. Wherein, the information of the subframes occupied by the E_Preamble_1&2 in each Frame and the information of the Frame interval for transmitting the E_Preamble_1&2 are configured in the UE1 and the node 2 by default, or sent by the node 2 to the UE1 via a downlink signaling in advance.

In addition, the information of the subframes occupied by the E_Preamble_1&2 in each Frame and the information of the Frame interval for transmitting the E_Preamble_1&2 may also be indicated by the index information of the LC_Preamble_1 and/or the LC_Preamble_2.

the resources used by the E_Preamble_1&2 can be same resources used by the non-MTC terminal for transmitting the random access sequence, or occupy the resources specifically allocated to the enhanced random access sequence. Moreover, the resource location occupied by the E_Preamble_1&2 in each subframe may be the same or different.

In the present specific embodiment, the resource used by the E_Preamble_1&2 is the resource specifically allocated to the enhanced random access sequence, and the resource location of the E_Preamble_1&2 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1&2 information sent by the UE1.

The Fourteenth Specific Embodiment

The fourteenth specific embodiment corresponds to the second enhanced random access channel resource allocation scheme, the first random access sequence arrangement mode, the sequence index parameter value, and the random access sequence being a plurality of random access sequences.

In a wireless communication system, there are the node 1 and the node 2 in the network, wherein, the node 1 is a non-MTC terminal or a MTC terminal; the node 2 may be one or more of a MacroCell, a MicroCell, a PicoCell, a Femtocell, and a Relay.

In the existing wireless communication system, taking into account the characteristics of the MTC terminal, the link performance of such a terminal is relatively poor in the existing network, and it needs to enhance the link performance thereof, in the following, a scheme for enhancing the random access channel will be described in detail:

1, the random access sequence allocated by the system to the MTC terminal for generating the enhanced random access sequence can be a random access sequence taken from the non-MTC terminal, or can be a random access sequence (different from the random access sequence taken from the non-MTC terminal) specifically used to generate the enhanced random access sequence.

In the present specific embodiment, the MTC terminal is the UE1, and the UE1 obtains more than one random access sequence, such as the LC_Preamble_1 and the LC_Preamble_2, random access sequences taken from the non-MTC terminal. Moreover, the sequence lengths of the LC_Preamble_1 and the LC_Preamble_2 can be different, for example, the LC_Preamble_1 and the LC_Preamble_2 can come from random access sequence set with different formats in the non-MTC terminal.

2, the UE1 needs to repeat the LC_Preamble_1 and the LC_Preamble_2 for K times to constitute into the enhanced random access sequence E_Preamble_1&2. Wherein, the value of K can be indicated by the index information of the LC_Preamble_1 and/or the LC_Preamble_2.

The random access sequences allocated to the MTC terminal for generating the enhanced random access sequence are divided into N groups, and each group comprises one or more of random access sequences used to generate the enhanced random access sequence, and each group corresponds to one repetition. In the present specific embodiment, the UE1 selects the LC_Preamble_1 and the LC_Preamble_2, and assume that they come from the same group, the corresponding number of repetitions is K=5.

In addition, the LC_Preamble_1 and the LC_Preamble_2 may also come from different groups, but the MTC UE and the node 2 need to agree in advance on the group corresponding to the number of repetitions K.

3, the schematic diagram of transmitting the enhanced random access sequence E_Preamble_1&2 on the enhanced random access channel is shown in FIG. 10; the E_Preamble_1&2 occupies the subframes UL subframe2, UL subframe7 and UL subframe8 in each frame, therefore a total of five Frames are needed to send the E_Preamble_1&2. The Frame interval for transmitting the E_Preamble_1 is 2 Frames. Wherein, the information of subframes occupied by the E_Preamble_1&2 in each Frame and the information of Frame interval for transmitting the E_Preamble_1&2 are configured in the UE1 and the node 2 by default, or sent by the node 2 to the UE1 via a downlink signaling in advance.

In addition, the information of subframes occupied by the E_Preamble_1&2 in each Frame and the information of Frame interval for transmitting the E_Preamble_1&2 may also be indicated by the index information of the LC_Preamble_1 and/or the LC_Preamble_2.

the resources used by the E_Preamble_1&2 can be the same resources used by the non-MTC UE for transmitting the random access sequence, or occupy the resources specifically allocated to the enhanced random access sequence. Moreover, the resource location occupied by the E_Preamble_1&2 in each subframe may be the same or different.

In the present specific embodiment, the resources used by the E_Preamble_1&2 are the resources specifically allocated to the enhanced random access sequence, and the resource location of the E_Preamble_1&2 in each subframe is the same.

4, since the node 2 already knew the resource location information of the enhanced random access channel and the constitution mode of the enhanced random access sequence, the node 2 can directly receive and detect on the enhanced random access channel to obtain the E_Preamble_1&2 information sent by the UE1.

Of course, the present document may have a variety of other embodiments, and without departing from the spirit and essence of the present document, a person skilled in the art can make various changes and modifications according to the present document, and these corresponding changes and modifications should belong to the protection scope of the appended claims of the present document.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

INDUSTRIAL APPLICABILITY

The embodiment of the present document performs an enhanced design on the Physical Random Access Channel (PRACH) in the LTE/LTE-A system, to improve the access quality of a machine type communication terminal, and ensure that the machine type communication terminal can normally access the system.

What is claimed is:

1. An enhanced random access sequence transmitting method, comprising:
    a node 1 generating an enhanced random access sequence according to a random access sequence and an enhanced configuration information, and the node 1 sending the enhanced random access sequence on an enhanced random access channel;
    wherein, the enhanced configuration information comprises at least one of the following: an arrangement mode information of the random access sequence, and a resource allocation information of the enhanced random access channel;
    wherein, the resource allocation information of the enhanced random access channel comprises at least one of the following: initial subframe index of the enhanced random access channel being n, and a resource allocation interval being m subframes; and
    when the resource allocation interval m is indicated by the index information of the random access sequence, the method comprises: the random access sequence being taken from a determined random access sequence set, wherein the determined random access sequence set corresponds to the resource allocation interval m.

2. The transmitting method of claim 1, wherein,
    the arrangement mode information of the random access sequence comprises one of the following information:
    repeatedly arranging the random access sequence for K times to constitute into the enhanced random access sequence, wherein K is an integer greater than 0;
    generating L derived random access sequences based on the random access sequence according to a predetermined principle, wherein L is an integer greater than 0, arranging the random access sequence and the derived random access sequences in accordance with a predetermined order to constitute into a random access long sequence, repeatedly arranging the random access long sequence for T times to constitute into the enhanced random access sequence, wherein, T is an integer greater than 0.

3. The transmitting method of claim 2, wherein,
    a number of the random access sequence is one or more, which is preselected by the node 1.

4. The transmitting method of claim 3, wherein,
    sequence lengths of different random access sequences are different.

5. The transmitting method of claim 1, wherein,
    the resource allocation interval m belongs to a resource allocation interval set M, an index value of the resource allocation interval m in the resource allocation interval set M is configured in the node 1 and a node 2 by default, or sent by the node 2 to the node 1 via a signaling in advance, or indicated by an index information of the random access sequence.

6. The transmitting method of claim 1, wherein,
when a resource location subframe determined by the node 1 according to the resource allocation information of the enhanced random access channel is a downlink subframe, the resource location subframe is changed to a previous or next uplink subframe closest to the downlink subframe.

7. The transmitting method of claim 1, wherein,
the resource allocation information of the enhanced random access channel comprises: sending the enhanced random access sequence on a frame identified as e+q*p, wherein, e is an initial frame index of a resource of the enhanced random access channel, p is resource allocation interval, and q=0, 1, . . . , $k^{Frame}$, wherein $k^{Frame}$ is a total number of frames occupied by the enhanced random access channel.

8. The transmitting method of claim 7, wherein,
a subframe index occupied by the enhanced random access channel in one frame is configured by a node 2 and sent to the node 1 or configured and stored in both the node 1 and the node 2 by default.

9. The transmitting method of claim 7, wherein,
a value of the resource allocation interval p belongs to a resource allocation interval set P, an index of the value of the resource allocation interval p in the resource allocation interval set P is configured in the node 1 and a node 2 by default, or sent by the node 2 to the node 1 through a signaling in advance, or indicated by index information of the random access sequence.

10. The transmitting method of claim 7, wherein,
when the resource allocation interval p is indicated by index information of the random access sequence, comprising: the random access sequence being taken from a determined random access sequence set, and the determined random access sequence set corresponds to the resource allocation interval p.

11. The transmitting method of claim 1, wherein,
a node 2 detects the enhanced random access sequence sent by the node 1 on the enhanced random access channel according to the enhanced configuration information.

12. The transmitting method of claim 11, wherein,
the node 1 is a machine type communication terminal or a non-machine type communication terminal;
the node 2 is one of a MacroCell, a MicroCell, a PicoCell, a Femtocell, and a Relay.

13. A machine type communication terminal, wherein,
the machine type communication terminal comprises an enhanced random access sequence generation module and an enhanced random access sequence transmission module;
the enhanced random access sequence generation module is configured to: generate an enhanced random access sequence according to a random access sequence and an enhanced configuration information;
the enhanced random access sequence transmission module is configured to: transmit the enhanced random access sequence on an enhanced random access channel;
wherein,
the enhanced configuration information comprises resource allocation information of the enhanced random access channel; the resource allocation information comprises at least one of the following: an initial subframe index of the enhanced random access channel being n, and resource allocation interval being m subframes;
wherein, when the resource allocation interval m is indicated by the index information of the random access sequence, the random access sequence is taken from a determined random access sequence set, wherein the determined random access sequence set corresponds to the resource allocation interval m.

14. The machine type communication terminal of claim 13, wherein,
the enhanced configuration information comprises arrangement mode information of the random access sequence;
the enhanced random access sequence generation module is configured to: repeatedly arrange the random access sequence for K times according to the arrangement mode information to constitute into the enhanced random access sequence, wherein K is an integer greater than 0; or; generate L derived random access sequences based on the random access sequence according to a predetermined principle, wherein L is an integer greater than 0, and arrange the random access sequence and the derived random access sequences according to a predetermined order to constitute into a random access long sequence, and repeatedly arrange the random access long sequence for T times to constitute into the enhanced random access sequence, wherein, T is an integer greater than zero.

15. The machine type communication terminal of claim 14, wherein,
the enhanced configuration information comprises resource allocation information of the enhanced random access channel; the resource allocation information comprises at least one of the following: an initial subframe index of the enhanced random access channel being n, and resource allocation interval being m subframes;
the enhanced random access sequence transmission module is configured to: determine resources for transmitting the enhanced random access sequence in an enhanced random access channel based on the resource allocation information of the enhanced random access channel; obtain an index of a value of the resource allocation interval m in a resource allocation interval set M from a default configuration or from a node other than the machine type communication terminal.

16. The machine type communication terminal of claim 13, wherein,
the enhanced random access sequence transmission module is configured to: determine resources for transmitting the enhanced random access sequence in an enhanced random access channel based on the resource allocation information of the enhanced random access channel; obtain an index of a value of the resource allocation interval m in a resource allocation interval set M from a default configuration or from a node other than the machine type communication terminal.

17. The machine type communication terminal of claim 13, wherein,
the resource allocation information of the enhanced random access channel comprises: transmitting the enhanced random access sequence on a frame identified as e+q*p, wherein, e is an initial frame index of a resource of the enhanced random access channel, p is resource allocation interval, and q=0, 1, . . . , $k^{Frame}$, wherein $k^{Frame}$ is a total number of frames occupied by the enhanced random access channel;
the enhanced random access sequence transmission module is configured to: determine resources used by the enhanced random access channel for transmitting the enhanced random access sequence according to the resource allocation information of the enhanced random access channel; obtain the index of the resource allocation interval p in the resource allocation interval set P from the default configuration or from a node other than the machine type communication terminal.

* * * * *